United States Patent [19]

Masuda et al.

[11] Patent Number: 5,199,799
[45] Date of Patent: Apr. 6, 1993

[54] BALL BEARING AND HEAD POSITIONING APPARATUS

[75] Inventors: Yoshimi Masuda, Yokohama; Masakazu Sasaki, Sagamihara; Kiyoshi Satoh, Fujisawa, all of Japan

[73] Assignee: International Business Machines Corporation, Armonk, N.Y.

[21] Appl. No.: 792,995

[22] Filed: Nov. 15, 1991

[30] Foreign Application Priority Data

Nov. 15, 1990 [JP] Japan .................................. 2-307333

[51] Int. Cl.⁵ ........................ F16C 33/66; F16C 33/38
[52] U.S. Cl. .................................... 384/470; 384/523
[58] Field of Search ............... 384/470, 523, 531, 527; 29/898.067

[56] References Cited

U.S. PATENT DOCUMENTS

| | | | |
|---|---|---|---|
| 1,767,107 | 6/1930 | Yates | 384/527 |
| 2,987,350 | 6/1961 | Hay | 384/470 |
| 3,539,231 | 11/1970 | Langstrom | 384/470 |
| 3,743,369 | 7/1973 | Langström | 384/470 |
| 4,586,833 | 5/1986 | Walter et al. | 384/531 |
| 4,781,877 | 11/1988 | Rabe | 29/898.067 X |

FOREIGN PATENT DOCUMENTS

| | | | |
|---|---|---|---|
| 65191 | 7/1913 | Switzerland | 384/523 |
| 700708 | 11/1979 | U.S.S.R. | 384/523 |

Primary Examiner—Thomas R. Hannon
Attorney, Agent, or Firm—Roy W. Truelson

[57] ABSTRACT

A ball bearing assembly includes a ball retainer for retaining within a predetermined area each of the balls positioned between an inner race and an outer race, the retainer having grease feeding holes which extend toward the balls. Grease is fed only to those balls which actually need lubrication, and no remaining grease flows into a gap between the inner race or the outer race and the ball retainer, therefore frictional force does not increase. In the preferred embodiment, the ball bearing assembly is used to support a head and carriage assembly of a data storage disk apparatus.

18 Claims, 10 Drawing Sheets

BALL BEARING AND HEAD POSITIONING APPARATUS

FIELD OF THE INVENTION

The present invention relates to a ball bearing assembly having a ball retainer positioned between an inner race and an outer race for retaining balls within predetermined areas, and to a head positioning apparatus in which a head carriage is mounted, through such a ball bearing assembly, on a base.

BACKGROUND OF THE INVENTION

FIG. 6 and FIG. 7 are a plan view and a side view, respectively, showing a head positioning apparatus of a conventional magnetic hard disk apparatus. A magnetic hard disk 102 is driven, through a spindle 104, by a spindle motor 106. A magnetic head 108 for writing data to the disk 102 and reading data from the disk 102 is mounted on one end of a carriage 110. The carriage 110 is fixed to a shaft 111, which is mounted, through a ball bearing 114, on a housing base 116 so that the carriage 110 can pivot on a center axis 112 of the shaft 111. The carriage 110 is fixed to the shaft 111 by using a general method in which a bolt is screwed into a tapped hole formed in the shaft 111. Fixed to an end opposite, with respect to the axis 112 of the shaft 111, to the one end of the carriage 110 on which the head 108 is mounted, is a coil 118. Above the coil 118, a permanent magnet 120 is provided at a predetermined distance from the coil 118 and, on the other hand, below the coil 118, a permanent magnet 122 is provided at a predetermined distance from the coil 118. The coil 118 and the permanent magnets 120 and 122 compose a voice coil motor. The carriage 110 is pivoted on the axis 112 by a force generated by a current flowing through the coil 118 and a magnetic field produced from the permanent magnets 120 and 122. A direction in which the carriage 110 pivots is determined by the current that flows through the coil 118.

FIG. 8 and FIG. 9 are a cross-sectional view and an exploded perspective view, respectively, showing a ball bearing assembly used for the conventional head positioning apparatus of FIG. 6 and FIG. 7. As shown in these figures, a ball bearing assembly 114 comprises an upper bearing section 114U and a lower bearing section 114D. For the upper bearing section 114U, grease 214U is applied to the top surface of a ball retainer 212U for retaining within a predetermined area, each of a plurality of balls 210U arranged between an inner race 206U formed integrally with the shaft 111 and an outer race 208U, and a shield ring 216U is provided on the top end of the outer race 208U to cover the grease 214U. For the lower bearing section 114D, grease 214D is applied to the bottom surface of a ball retainer 212D for retaining within a predetermined area, each of a plurality of balls 210D positioned between an inner race 206D formed integrally with the shaft 111 and an outer race 208D, and a shield ring 216D is provided on the bottom end of the outer race 208D to cover the grease 214D.

Also a ball bearing assembly disclosed in Japanese Published Unexamined Patent Application (PUPA) No. 1-316518 has a ball retainer with grease applied to its top surface.

In the conventional ball bearing assembly shown in FIG. 8 and FIG. 9, since remaining grease 214U flows into a gap between the inner race and shaft 111 and the retainer 212U as shown in FIG. 10, frictional force applied to the inner race and shaft 111 increases to prevent the shaft 111 from rotating smoothly. Also the grease 214D applied to the bottom surface of the retainer 212D of the lower bearing section 114D increases frictional force to the inner race and shaft 111.

Also in the case of the ball bearing disclosed in Japanese PUPA No. 1-316518, it is considered that remaining grease flows into a gap between an inner race and a bearing by which frictional force to the inner race is increased, as described above.

In a head positioning apparatus in which a carriage for supporting a head is mounted, through a bearing, on a housing base, the increase of frictional force to a shaft or an inner race caused by the remaining grease, as described above, causes the accuracy of positioning to be reduced.

SUMMARY OF THE INVENTION

An object of the present invention is to provide a ball bearing assembly in which remaining grease does not cause high friction.

Another object of the present invention is to provide a head positioning apparatus in which remaining grease does not cause high friction.

The ball bearing assembly according to the present invention includes a ball retainer for retaining within a predetermined area each of the balls positioned between an inner race and an outer race, the retainer having grease feeding holes which extend toward the balls.

The head positioning apparatus according to the present invention includes a ball retainer for retaining within a predetermined area each of the balls positioned between an inner race and an outer race of a ball bearing assembly, which is used for mounting a carriage for supporting a head on a base, the retainer having grease feeding holes which extend toward the balls.

In the ball bearing assembly and the head positioning apparatus according to the present invention, grease is fed only to those balls which actually need lubrication, and no remaining grease flows into a gap between the inner race or the outer race and the ball retainer, therefore frictional force does not increase.

DETAILED DESCRIPTION OF THE PREFERRED EMBODIMENT

Figure 1:
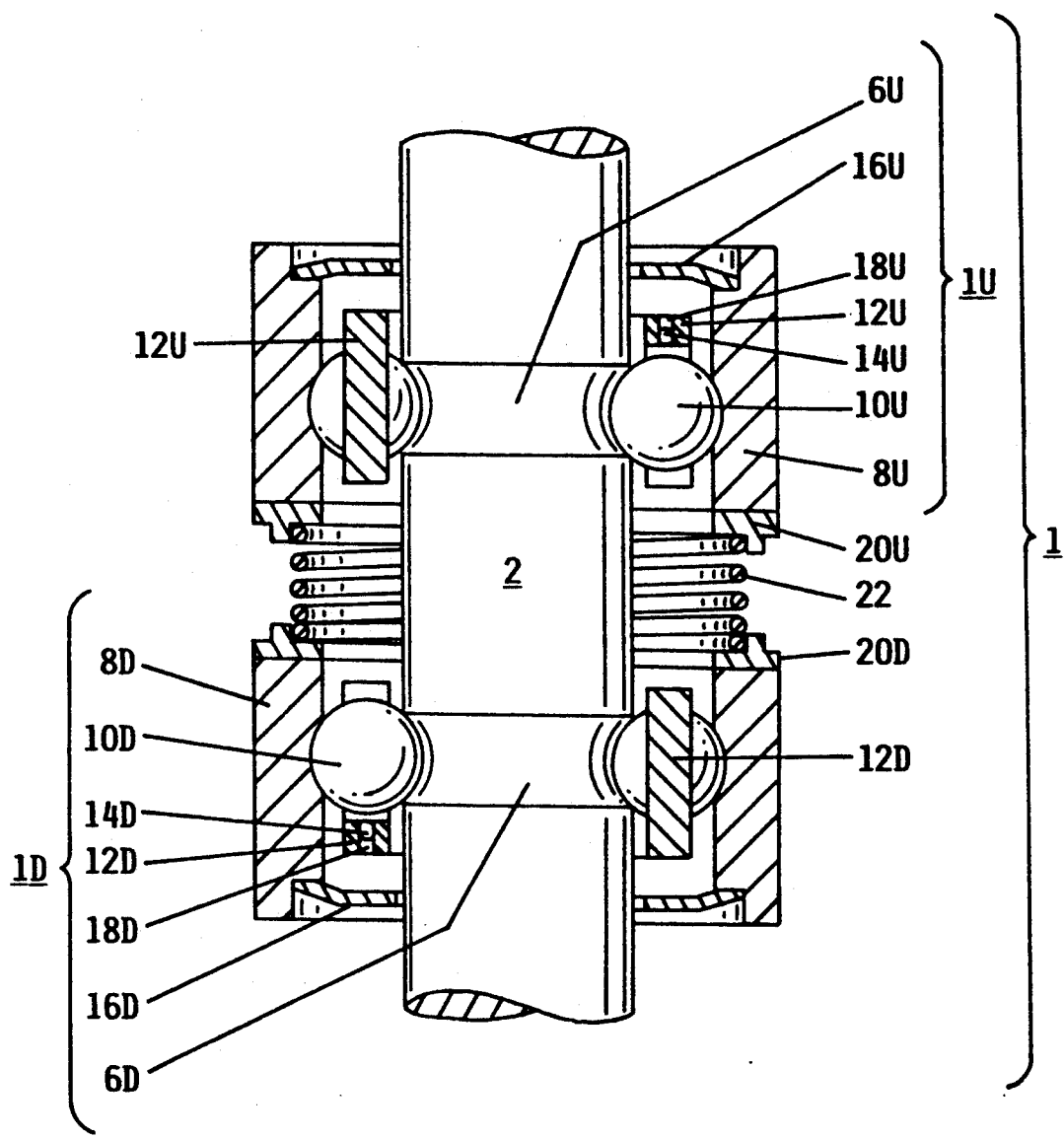
FIG. 1 is a cross-sectional view showing an embodiment of a ball bearing assembly in accordance with the present invention.
Figure 2:
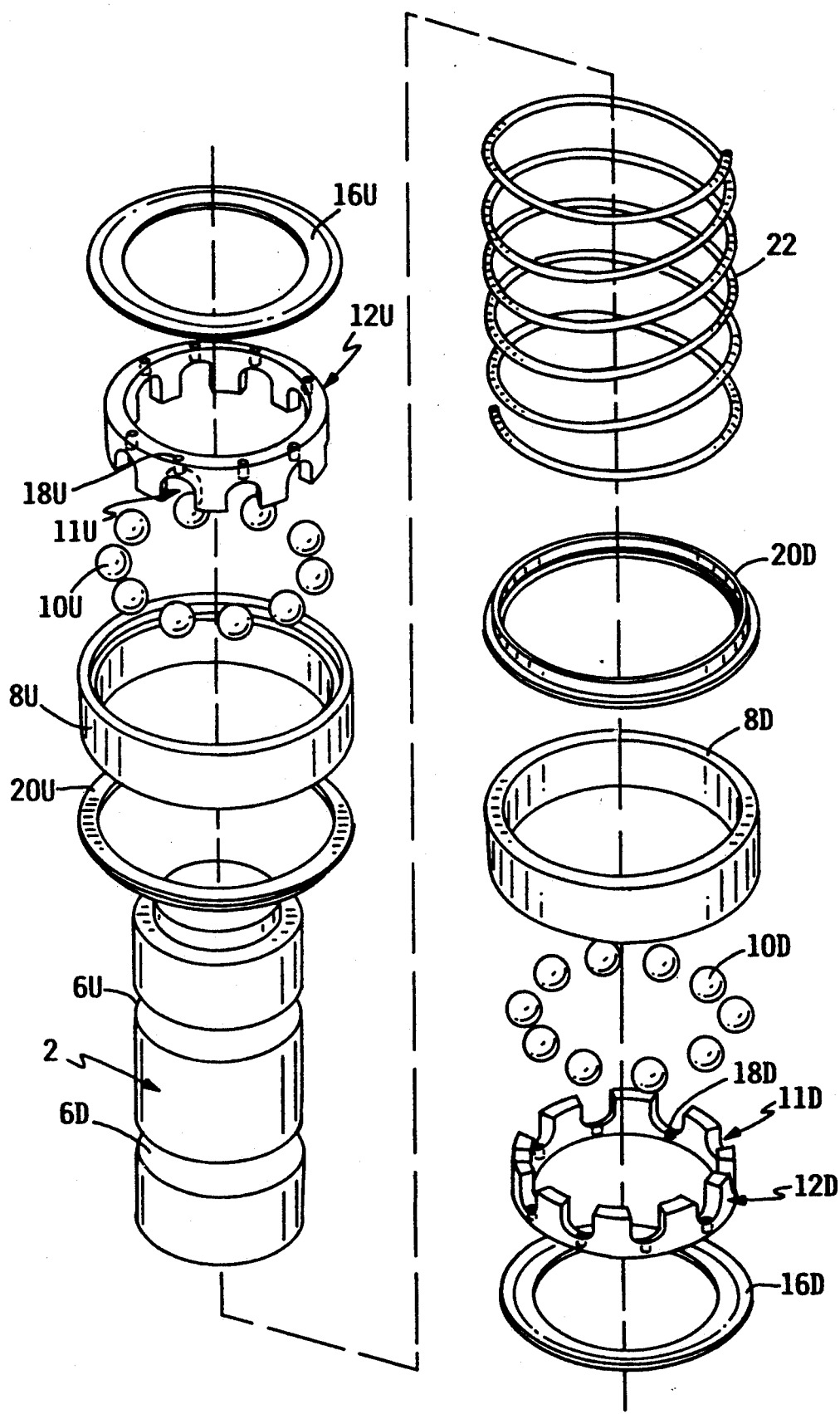
FIG. 2 is an exploded view showing the components of the embodiment of FIG. 1.

FIG. 1 and FIG. 2 are cross-sectional and exploded perspective views, respectively, showing an embodiment of a ball bearing constructed in accordance with the present invention. A ball bearing assembly 1 shown in the figures comprises an upper bearing section 1U and a lower bearing section 1D provided below the upper bearing section 1U. The upper bearing section 1U comprises an inner race 6U formed integrally with a shaft 2 on which the bearing 1 is mounted, an outer race 8U positioned coaxially and facing with the inner race 6U, a plurality of balls (ten balls in the embodiment) 10U provided between the inner race 6U and the outer race 8U, a ball retainer 12U which is formed from a hollow and cylindrical piece having a plurality of U-shaped cuts (ten cuts in the embodiment) 11U at its bottom surface, each receiving one of the balls 10U, and a shield ring 16U fixed to the top end of the outer race 8U to cover the top surface of the retainer 12U. Since the balls 10U are accommodated in the respective U-shaped cuts 11U made in the retainer 12U, the circumferential movement of the shaft 2 is limited and two neighboring balls 10U retained within the predetermined areas are prevented from coming into contact with each other.

The lower bearing section 1D comprises an inner race 6D formed integrally with the shaft 2 on which the bearing 1 is mounted, an outer race 8D positioned coaxially with and facing the inner race 6D, a plurality of balls (ten balls in the embodiment) 10D provided between the inner race 6D and the outer race 8D, a ball retainer 12D which is formed from a hollow and cylindrical piece having a plurality of U-shaped cuts (ten cuts in the embodiment) 11D at its top surface, each receiving one of the balls 10D, and a shield ring 16D fixed to the bottom end of the outer race 8D to cover the bottom surface of the retainer 12D. Since the balls 10D are accommodated in the respective U-shaped cuts 11D made in the retainer 12D, the circumferential movement of the shaft 2 is limited and two neighboring balls 10D retained within the predetermined areas are prevented from coming into contact with each other.

To prevent the upper bearing section 1U and the lower bearing section 1D from moving in the axial direction of the shaft 2, spring hold rings 20U and 20D are provided at the bottom surface of the outer race 8U and the top surface of the outer race 8D, respectively, and a pressuring spring 22 is provided between the rings 20U and 20D.

In the retainer 12U, grease feeding holes 18U which extend toward the balls 10U are made. The holes 18U are provided so that a hollow and cylindrical piece forming the retainer 12U is pierced thereby from the top surface to the U-shaped cuts 11U. In the retainer 12D, grease feeding holes 18D which extend toward the balls 10U are made. The holes 18D are provided so that a hollow and cylindrical piece forming the retainer 12D is pierced thereby from the bottom surface to the U-shaped cuts 11D.

Figure 3:
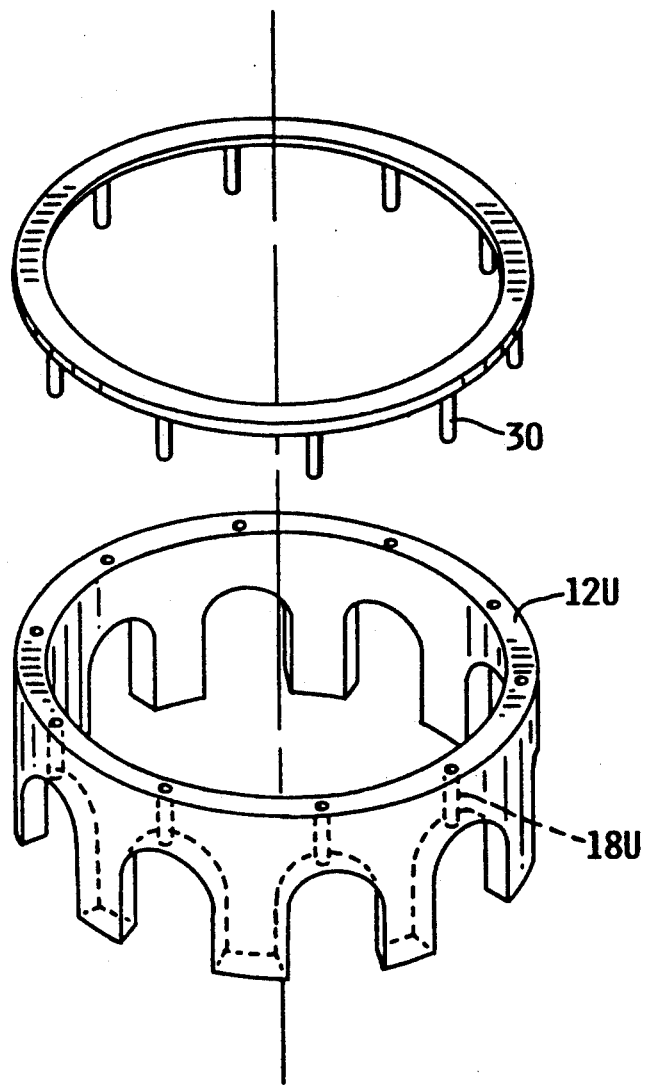
FIG. 3 is a perspective view showing a crown-cap type retainer, shown in FIG. 1 and FIG. 2, having grease feeding holes, and a grease dispenser.

FIG. 1 shows a structure where the grease 14U and 14D are already supplied to the grease feeding holes 18U and 18D. To supply the grease to the grease feeding holes 18U, as shown in, for example, FIG. 3, a grease dispenser 30 may be used to emit the grease just like a syringe.

In the embodiment of FIG. 1 and FIG. 2, since the grease feeding holes 18U and 18D which extend toward the balls 10U and 10D, are made in the retainers 12U and 12D, respectively, grease is fed only to the balls 10U and 10D which actually need lubrication and no excessive grease flows into a gap between the inner race 6U, that is, the shaft 2 and the retainer 12U and a gap between the inner race 6D, that is, the shaft 2 and the retainer 12D so that high friction is not caused between the inner races 6U and 6D, that is, the shaft 2 and the bearing 1.

Figure 4:
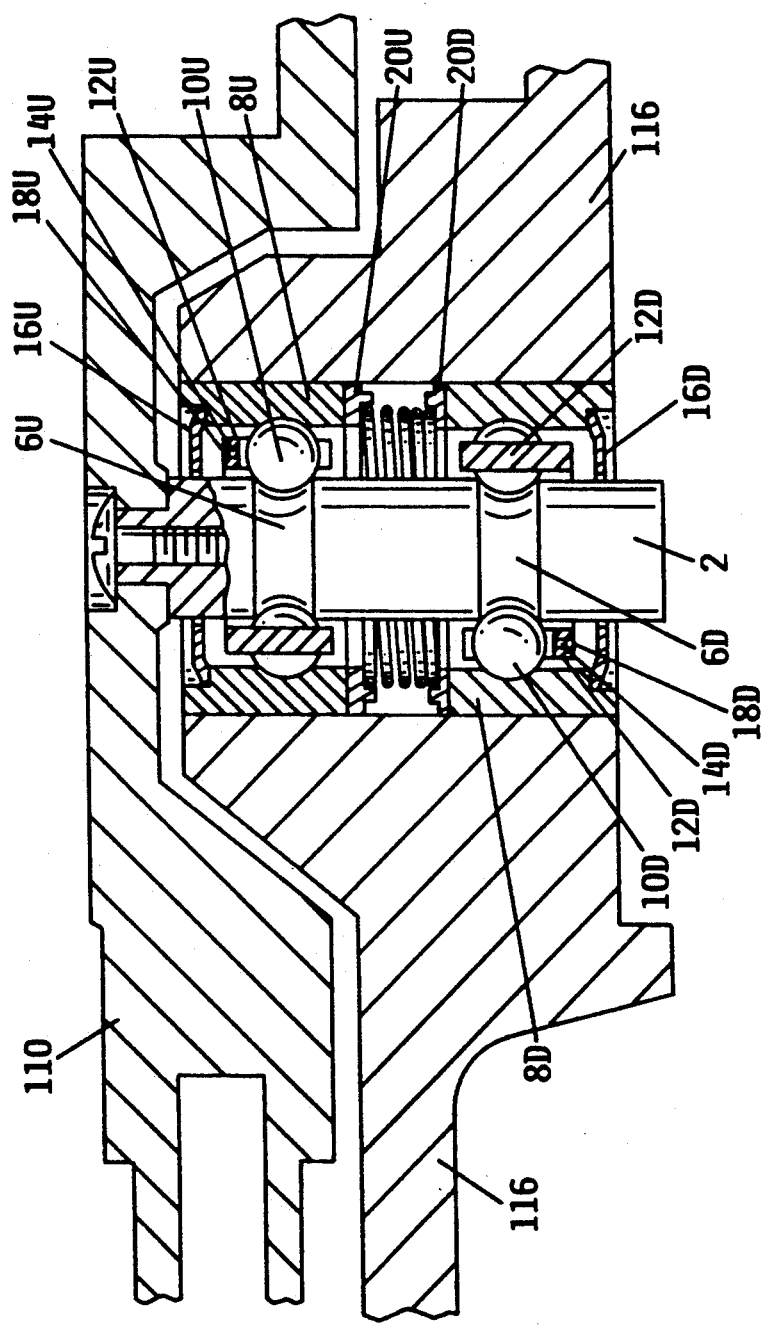
FIG. 4 is a cross-sectional view showing an embodiment of a head positioning apparatus in which the bearing shown in FIG. 1 is used.
Figure 6:
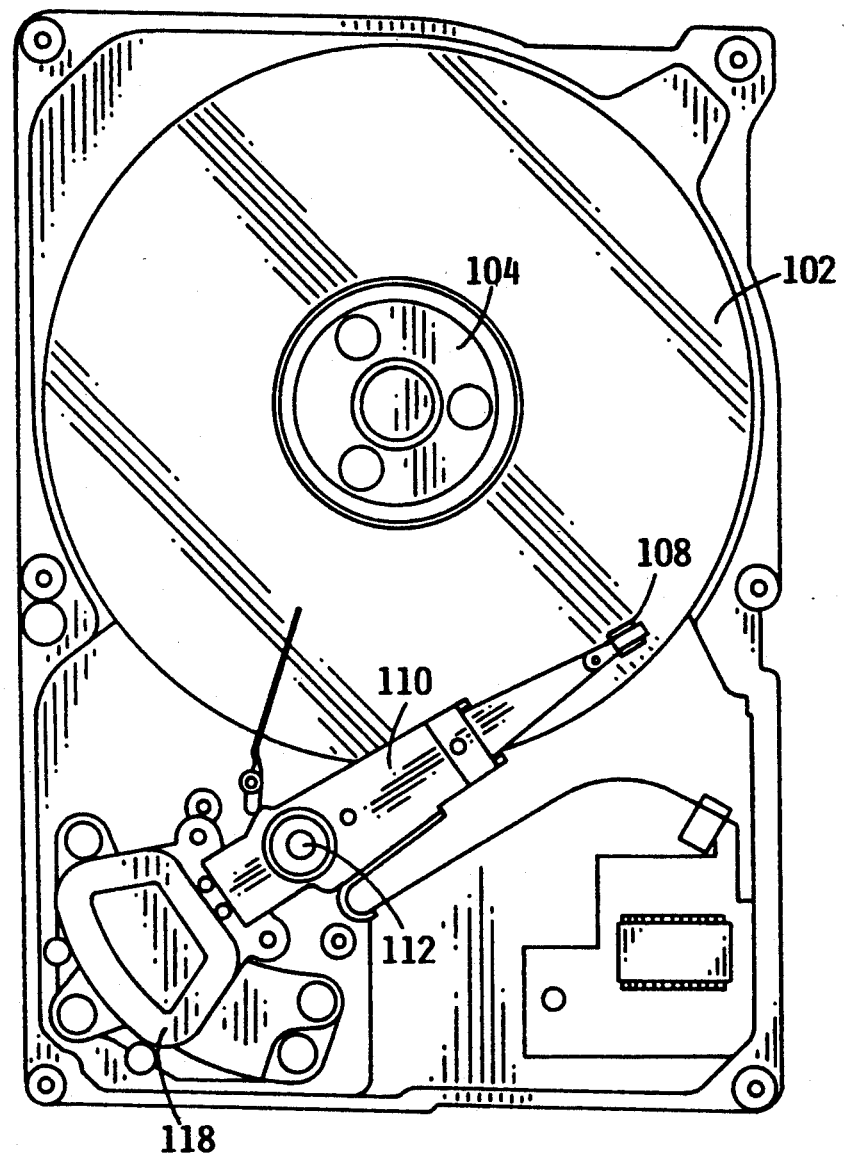
FIG. 6 is a plan view showing a head positioning apparatus of a conventional magnetic disk apparatus.
Figure 7:
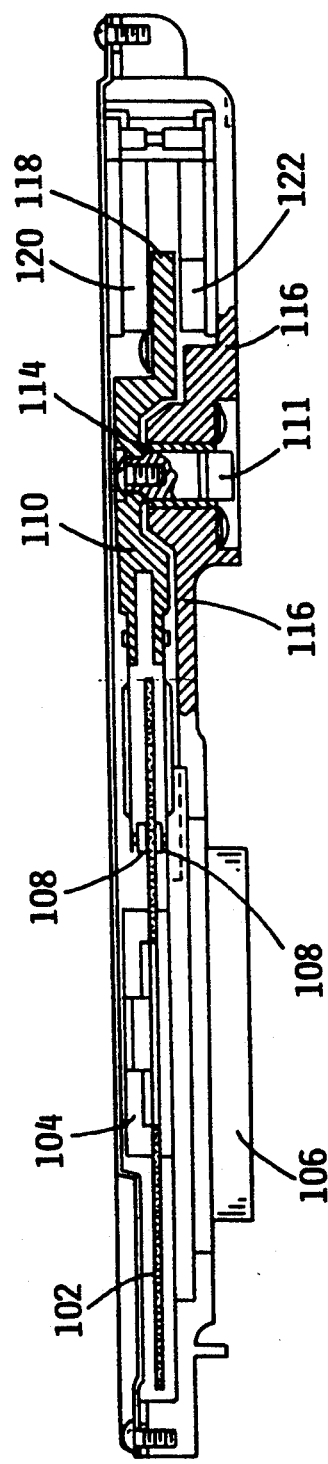
FIG. 7 is a side view showing the conventional head positioning apparatus of FIG. 6, a part of which is shown by a cross-sectional view.
Figure 8:
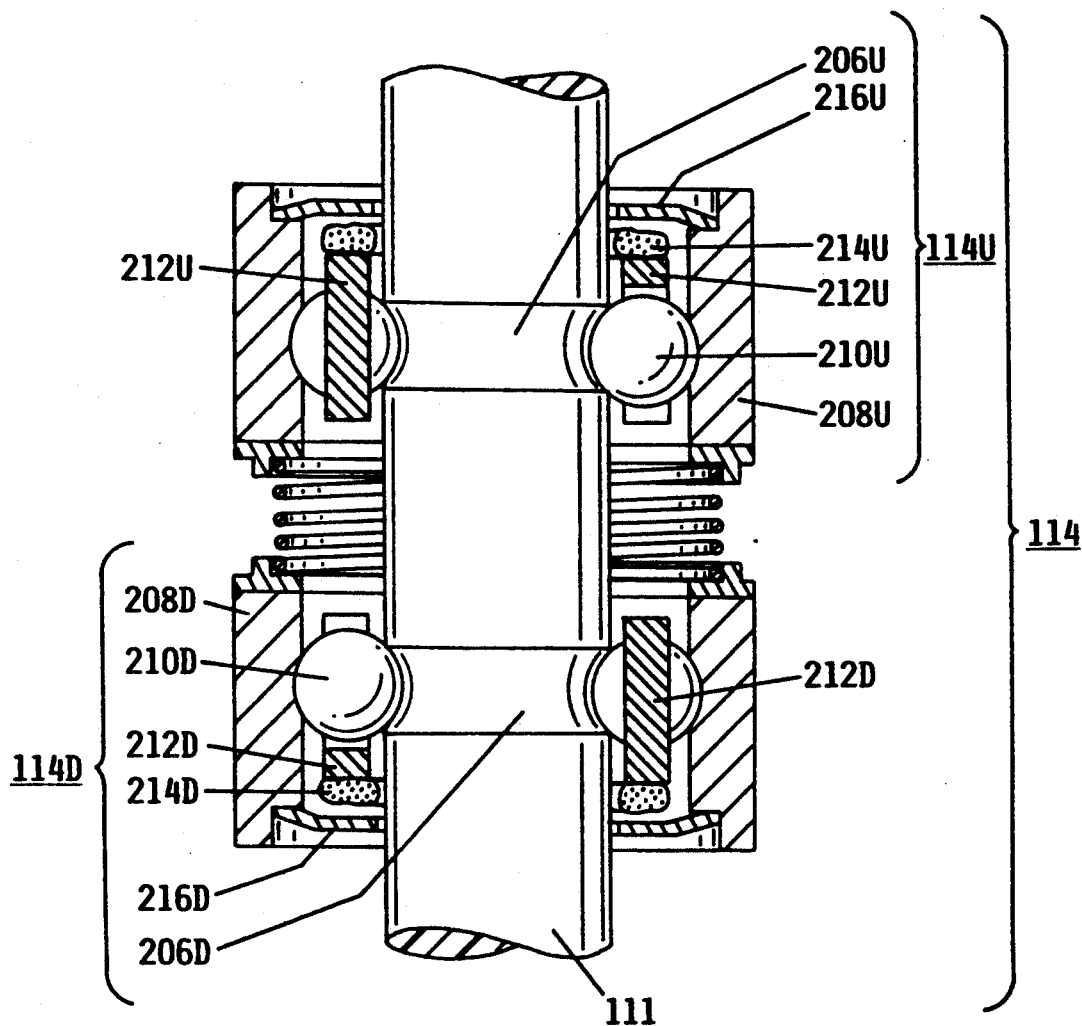
FIG. 8 is a cross-sectional view of a ball bearing assembly used in the conventional head positioning apparatus shown in FIG. 6 and FIG. 7.
Figure 9:
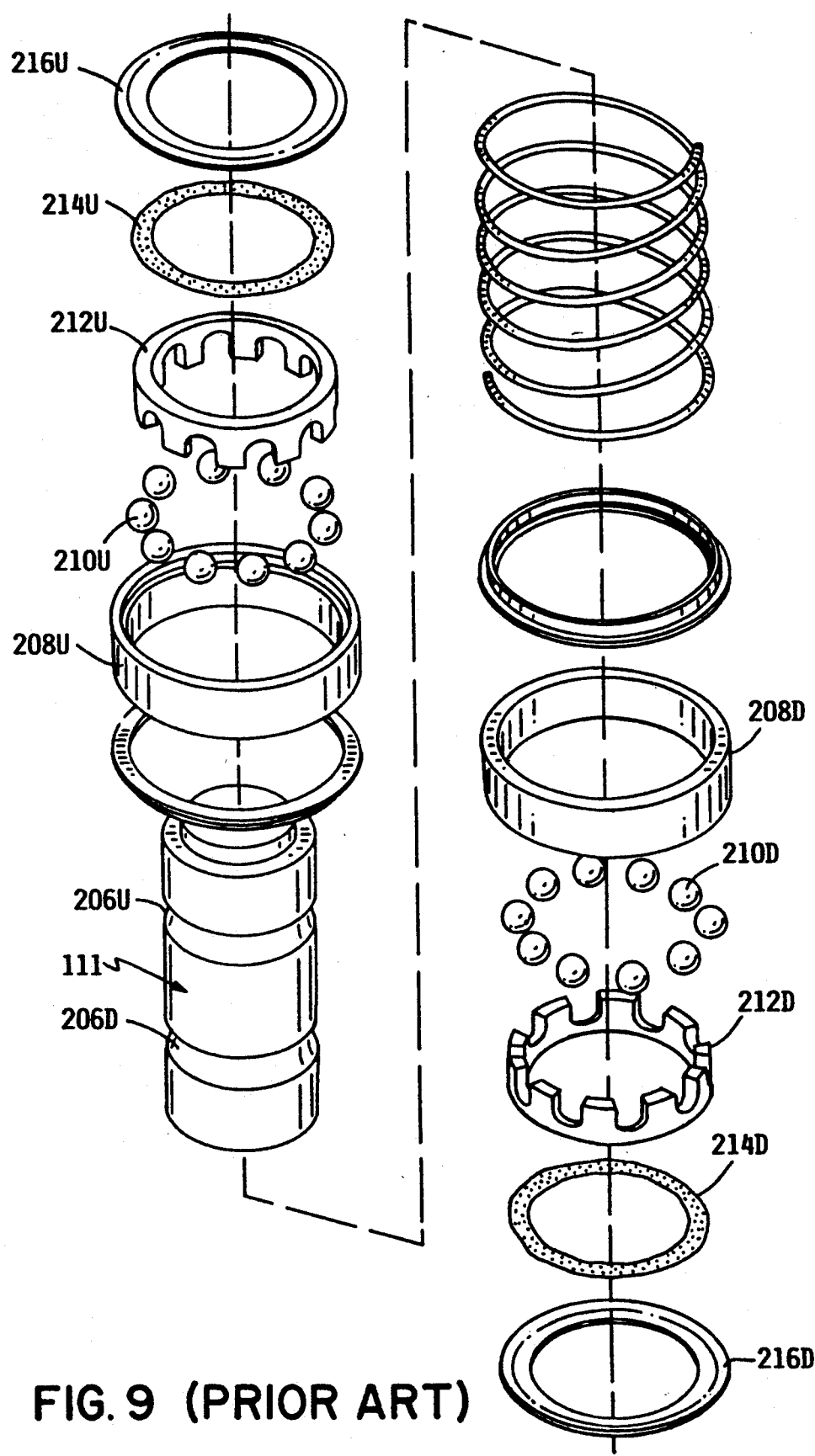
FIG. 9 is an exploded view showing the components of the bearing used in the conventional head positioning apparatus shown in FIG. 6 and FIG. 7.
Figure 10:
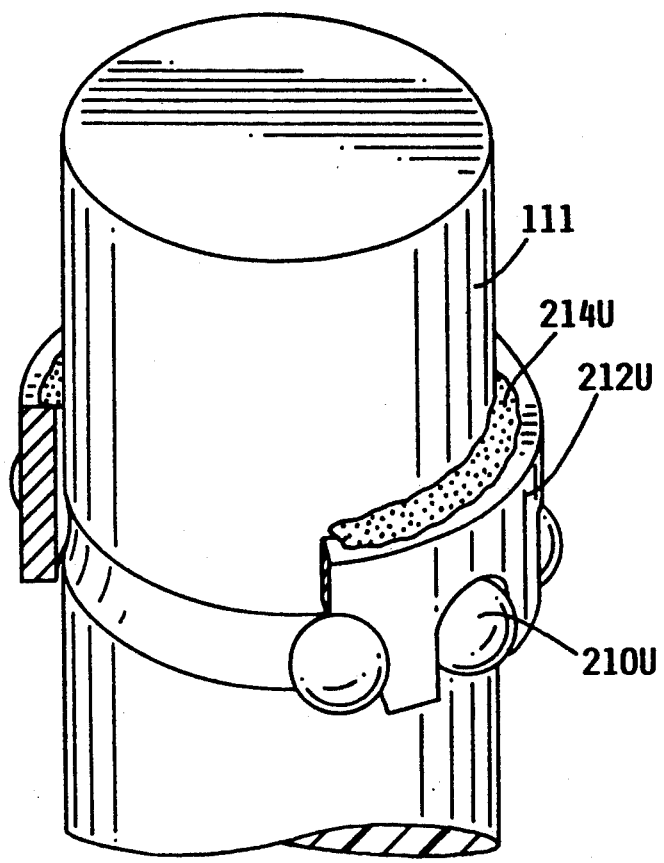
FIG. 10 is a partial perspective view showing an appearance of grease in the neighborhood of a ball retainer of the bearing of the conventional head positioning apparatus shown in FIG. 6 and FIG. 7.

FIG. 4 shows an embodiment of a head positioning apparatus, which uses the bearing 1 shown in FIG. 1 and FIG. 2, constructed in accordance with the present invention. In FIG. 4, the same components as those shown in FIG. 1 and FIG. 2 are given the same reference numbers, which will not be explained. Referring to FIG. 4, the outer race 8D has a flange (not shown) formed at its bottom end and fixed to a housing base 116, and the shaft 2 is fixed to a carriage 110 for supporting a head. The carriage 110 is driven, as in the prior art of FIG. 6 and FIG. 7, by a voice coil motor comprising a coil 118 and permanent magnets 120 and 122, to pivot on the axis of the shaft 2, and to be positioned to a disk 102.

In the head positioning apparatus of FIG. 4, since the grease is fed only to the balls 10U and 10D which actually need lubrication, no excessive grease flows into the gap between the inner race 6U, that is, the shaft 2 and the retainer 12U and the gap between the inner race 6D, that is, the shaft 2 and the retainer 12D so that high friction is not caused and the accuracy of positioning is not reduced.

Figure 5:
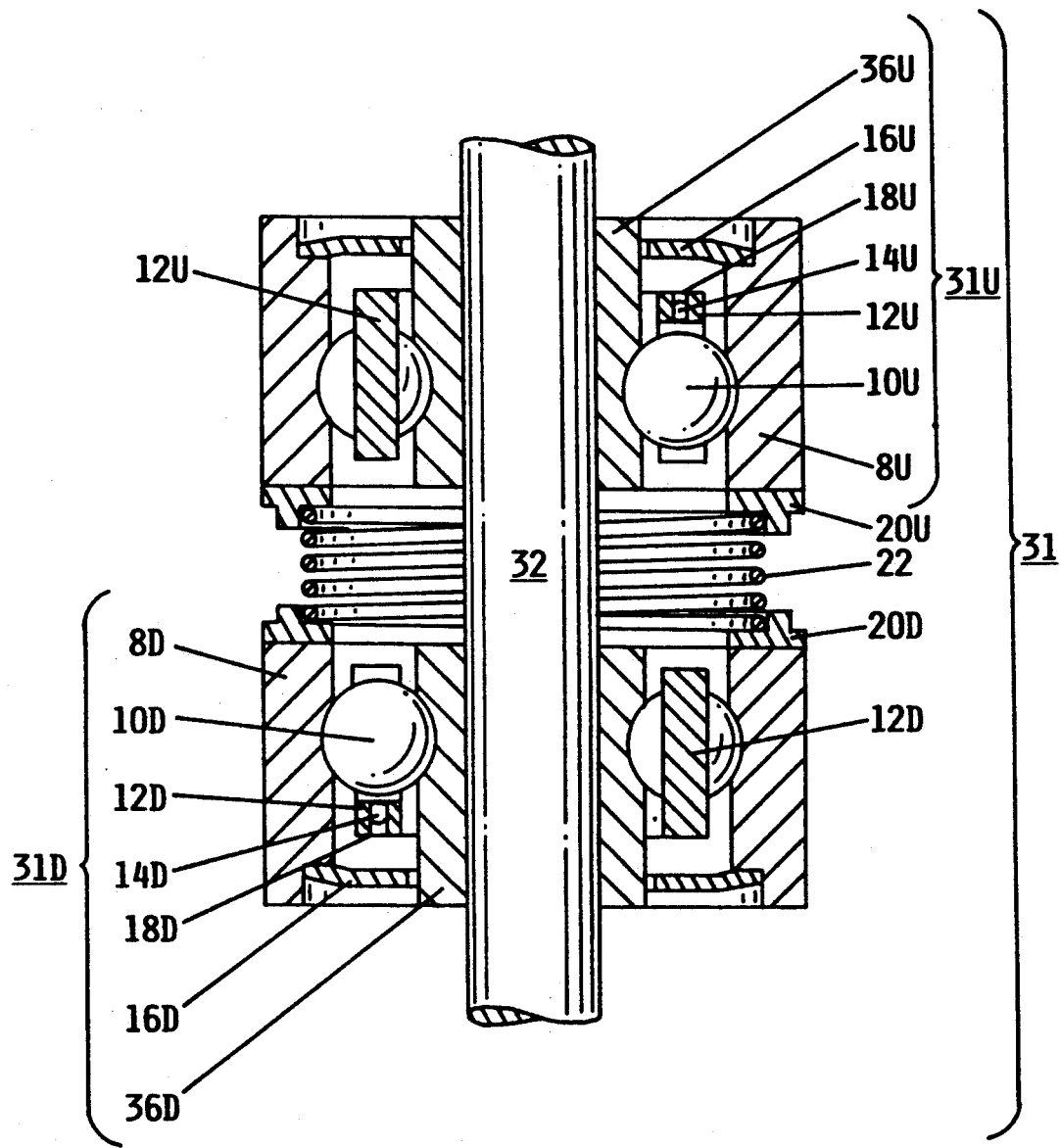
FIG. 5 is a cross-sectional view showing another embodiment of a ball bearing assembly in accordance with the present invention.

FIG. 5 shows another embodiment of a ball bearing constructed in accordance with the present invention. According to the embodiment, an inner race comprises a component separate from a shaft. Referring to FIG. 5, a ball bearing assembly 31 comprises an upper bearing section 31U and a lower bearing section 31D, and an inner race 36U of the upper bearing section 31U and an inner race 36D of the lower bearing section 31D are fixed to a shaft 32. As the embodiment of FIG. 1 and FIG. 2, in the retainer 12U for retaining the balls 10U within the predetermined areas which are positioned between the inner race 36U and the outer race 8U, the grease feeding, holes 18U which extend toward the balls 10U are made and, on the other hand, in the retainer 12D for retaining the balls 10D within the predetermined areas which are positioned between the inner race 36D and the outer race 8D, the grease feeding holes 18D which extend toward the balls 10D are made. Therefore, no remaining grease flows into a gap between the inner race 36U and the retainer 12U, a gap between the inner race 36D and the retainer 12D, a gap between the outer race 8U and the retainer 12U, and a gap between the outer race 8D and the retainer 12D so that high friction is not caused.

Comparing the embodiment of FIG. 1 with that of FIG. 5, the embodiment of FIG. 1 has the inner races formed integrally with the shaft and is, thereby, advantageous in that a lesser number of parts are required.

The embodiments described above relate to the ball bearing assembly in which the inner races rotate and the outer races are fixed. However, it will be appreciated that the present invention can be applied not only to the above bearing, but also to a bearing in which inner races are fixed and outer races rotate. Also in such a bearing, no remaining grease flows into a gap between a retainer and an outer race and a gap between the retainer and an inner race so that frictional force to the outer race is not increased.

By using the above bearing in which the inner races are fixed and the outer races rotate, a head positioning apparatus of a magnetic disk apparatus can be constructed. In this case, a shaft, inner races, and outer races are fixed to the housing base of the disk apparatus, the shaft, and a carriage, respectively.

According to the present invention, grease is fed only to the balls which actually need lubrication and no remaining grease flows into a gap between an inner race or an outer race and a retainer so that frictional force is not increased.

What is claimed is:

1. A ball bearing assembly, comprising:
    an first inner race;
    an first outer race positioned coaxially with and facing said first inner race;
    a first plurality of balls positioned between said first inner race and said first outer race; and
    a first ball retainer, wherein said retainer contains a plurality of holes extending through said retainer, through which a controlled quantity of grease is fed to said balls, said retainer preventing said grease from contacting said balls except by passage though said plurality of holes.

2. The ball bearing assembly of claim 1, wherein said retainer is substantially a hollow cylinder having a plurality of U-shaped cuts for receiving said balls at a first end face thereof.

3. The ball bearing assembly of claim 2, wherein each of said holes corresponds to one of said U-shaped cuts, and wherein each said hole extends from a second end face of said retainer opposite said first end face to a respective apex of a U-shaped cut.

4. The ball bearing assembly of claim 2, wherein said inner race is formed integrally with a shaft on which said ball bearing assembly is to be mounted.

5. The ball bearing assembly of claim 1, further comprising:
    a second inner race positioned below said first inner race;
    a second outer race positioned coaxially with and facing with said second inner race;
    a second plurality of balls positioned between said second inner race and said second outer race; and
    a second ball retainer, wherein said retainer contains a plurality of holes extending through said retainer, through which a controlled quantity of grease is fed to said second plurality of balls, said second ball retainer preventing said grease from contacting said second plurality of balls except by passage through said plurality of holes.

6. The ball bearing assembly of claim 5, wherein each said first and second retainer is substantially a hollow cylinder having a plurality of U-shaped cuts for receiving said balls at a first end face thereof.

7. The ball bearing assembly of claim 6, wherein each of said holes extending through said first and second retainer corresponds to one of said U-shaped cuts, and wherein each said hole extends from a second end face of a respective retainer opposite a first end face thereof to a respective apex of a U-shaped cut.

8. The ball bearing assembly of claim 6, wherein said first and second inner races are formed integrally with a shaft on which said ball bearing assembly is to be mounted.

9. A head positioning apparatus for positioning a head relative to a data storage disk, comprising:
    a head for accessing data on said data storage disk;
    a carriage attached to said head, said carriage being pivotable about an axis of a shaft;
    a ball bearing assembly supporting said carriage, said ball bearing assembly comprising a first inner race centered about said axis, a first outer race positioned coaxially with and facing said inner race, a first plurality of balls positioned between said first inner race and said first outer race, and a first ball retainer, wherein said retainer contains a plurality of holes extending through said retainer, through which a controlled quantity of grease is fed to said balls, said retainer preventing said grease from contacting said balls except by passage through said plurality of holes.

10. The head positioning apparatus of claim 9, wherein said retainer is substantially a hollow cylinder having a plurality of U-shaped cuts for receiving said balls at a first ned face thereof, wherein each of said holes corresponds to one of said U-shaped cuts, and wherein each said hole extends form a second end face of said retainer opposite said first end face to a respective apex of a U-shaped cut.

11. The head positioning apparatus of claim 10, wherein said inner race is formed integrally with said shaft.

12. The head positioning apparatus of claim 9, wherein said ball bearing assembly further comprises a second inner race centered about said axis and positioned below said first inner race, a second outer race positioned coaxially with and facing with said second inner race, a second plurality of balls positioned between said second inner race and said second outer race, and a second ball retainer, wherein said retainer contains a plurality of holes extending through said retainer, through which a controlled quantity of grease is fed to said second plurality of balls, said second ball retainer preventing said grease form contacting said second plurality of balls except by passage through said plurality of holes.

13. The head positioning apparatus of claim 12, wherein each said first and second retainer is substantially a hollow cylinder having a plurality of U-shaped cuts for receiving said balls at a first end face thereof, wherein each of said holes extending through said first and second retainer corresponds to one of said U-shaped cuts, and wherein each said hole extends from a second end face of a respective retainer opposite a first end face thereof to a respective apex of a U-shaped cut.

14. A disk apparatus for storing data, comprising:
    a housing base;
    a spindle mounted on said housing base;
    at least one data storage disk attached to said spindle;
    a spindle motor attached to said spindle for rotating said disk;
    a head for accessing data on said data storage disk;
    a carriage attached to said head;
    a shaft supporting said carriage;

means for pivoting said carriage about the axis of said shaft;

a ball bearing assembly supporting said carriage, said ball bearing assembly comprising a first inner race centered about said axis, a first outer race positioned coaxially with and facing said inner race, a first plurality of balls positioned between sa id first inner race and said first outer race, and a first ball retainer, wherein said retainer contains a plurality of holes extending through said retainer, through which a controlled quantity of grease is fed to said balls, said retainer preventing said grease from contacting said balls except by passage through said plurality of holes.

15. The disk apparatus of claim 14, wherein said retainer is substantially a hollow cylinder having a plurality of U-shaped cuts for receiving said balls at a first end face thereof, wherein each of said holes corresponds to one of said U-shaped cuts, and wherein each said hole extends form a second end face of said retainer opposite said first end face to a respective apex of a U-shaped cut.

16. The disk apparatus of claim 14, wherein said inner race is formed integrally with said shaft.

17. The disk apparatus of claim 14, wherein said ball bearing assembly further comprises a second inner race centered about said axis and positioned below said first inner race, a second outer race positioned coaxially with and facing with said second inner race, a second plurality of balls positioned between said second inner race and said second outer race, and a second ball retainer, wherein said retainer contains a plurality of holes extending through said retainer, through which a controlled quantity of grease is fed to said second plurality of balls, said second ball retainer preventing said grease from contacting said second plurality of balls except by passage through said plurality of holes.

18. The disk apparatus of claim 17, wherein each said first and second retainer is substantially a hollow cylinder having a plurality of U-shaped cuts for receiving said balls at a first end face thereof, wherein each of said holes extending through said first and second retainer corresponds to one of said U-shaped cuts, and wherein each said hole extends from a second end face of a respective retainer opposite a first ned face thereof to a respective apex of a U-shaped cut.

* * * * *